US009984540B2

(12) United States Patent
Nahman et al.

(10) Patent No.: US 9,984,540 B2
(45) Date of Patent: May 29, 2018

(54) FAN-DRIVEN FORCE DEVICE

(71) Applicant: HARMAN INTERNATIONAL INDUSTRIES, INC., Stamford, CT (US)

(72) Inventors: Jaime Elliot Nahman, Oakland, CA (US); Stefan Marti, Oakland, CA (US); Davide Di Censo, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days. days.

(21) Appl. No.: 14/973,682

(22) Filed: Dec. 17, 2015

(65) Prior Publication Data

US 2017/0178469 A1 Jun. 22, 2017

(51) Int. Cl.
*H04B 3/36* (2006.01)
*G08B 6/00* (2006.01)

(52) U.S. Cl.
CPC .................................... *G08B 6/00* (2013.01)

(58) Field of Classification Search
CPC ........................................................ G08B 6/00
USPC ....................................................... 340/407.1
See application file for complete search history.

(56) References Cited

U.S. PATENT DOCUMENTS

D264,016 S 4/1982 Fournier
5,222,569 A 6/1993 Martel
5,425,620 A * 6/1995 Stroud .................. A42B 1/008 2/171.3
6,234,045 B1 5/2001 Kaiser
6,798,443 B1 9/2004 Maguire, Jr.
7,437,214 B2 10/2008 Sabe et al.
7,551,104 B2 6/2009 Meng
8,284,070 B2 10/2012 Chaudhari et al.
8,330,305 B2 12/2012 Hart et al.
8,783,264 B2 7/2014 Levondowski et al.
9,002,641 B2 4/2015 Showering
2007/0091063 A1 * 4/2007 Nakamura .............. G06F 3/016 345/156

(Continued)

FOREIGN PATENT DOCUMENTS

WO 20140125448 A1 8/2014

OTHER PUBLICATIONS

"Explore Dyson's Latest Bladeless Fan Technology", Dyson.com, 6 pages, http://www.dyson.com/air-treatment/cooling-fans.

(Continued)

*Primary Examiner* — Kerri McNally
*Assistant Examiner* — Thang Tran
(74) *Attorney, Agent, or Firm* — Artegis Law Group, LLP

(57) ABSTRACT

A system for exerting forces on a user. The system includes a user-mounted device including one or more force exerting devices, one or more sensors configured to acquire sensor data, and a processor coupled to the one or more force exerting devices and to the one or more sensors. The processor is configured to determine, based on the sensor data, at least one of an orientation and a position associated with the user-mounted device. The processor is further configured to compute a force to be exerted on the user via the one or more force exerting devices based on a force direction associated with a force event and at least one of the orientation and the position, and generate a control signal for the one or more force exerting devices based on the force.

26 Claims, 10 Drawing Sheets

(56) References Cited

U.S. PATENT DOCUMENTS

| | | | | |
|---|---|---|---|---|
| 2011/0204188 | A1* | 8/2011 | Marcus | B64C 29/0058 244/23 B |
| 2011/0268290 | A1* | 11/2011 | Lee | H04R 5/0335 381/74 |
| 2012/0201670 | A1* | 8/2012 | Takeshita | F04D 29/522 415/212.1 |
| 2013/0115579 | A1* | 5/2013 | Taghavi | G06F 3/016 434/113 |
| 2013/0257582 | A1* | 10/2013 | Rothkopf | G06F 1/1656 340/3.1 |
| 2014/0218184 | A1* | 8/2014 | Grant | G08B 6/00 340/407.1 |
| 2014/0272915 | A1* | 9/2014 | Higashino | B06B 1/16 434/365 |
| 2015/0109149 | A1* | 4/2015 | Duncan | G08G 1/005 340/944 |
| 2015/0196101 | A1* | 7/2015 | Dayal | G01C 21/3602 63/1.11 |
| 2015/0335284 | A1 | 11/2015 | Nuovo et al. | |
| 2016/0019817 | A1* | 1/2016 | Deokar | G08B 6/00 340/4.12 |
| 2016/0034035 | A1* | 2/2016 | Higashino | G06F 3/012 345/156 |
| 2016/0093207 | A1* | 3/2016 | Di Censo | H04R 1/1091 340/944 |
| 2016/0101856 | A1* | 4/2016 | Kohstall | G05D 1/101 244/17.13 |
| 2016/0267755 | A1* | 9/2016 | Martinson | G08B 6/00 |
| 2017/0106277 | A1* | 4/2017 | Perdigon Rodriguez | G06F 3/011 |

OTHER PUBLICATIONS

"Nod (gesture)", Wikipedia, 3 pages, https://en.wikipedia.org/wiki/Nod_(gesture).
"Stereotypy", Wikipedia, 3 pages, https://en.wikipedia.org/wiki/Stereotypy.
International Search Report and Written Opinion for PCT/US2016/062420 dated Jan. 24, 2017.

* cited by examiner

FAN-DRIVEN FORCE DEVICE

BACKGROUND

Field of the Embodiments

The various embodiments relate generally to human-machine interfaces and, more specifically, to a fan-driven force device.

Description of the Related Art

One problem with many electronic devices is the reliance on traditional output methodologies. In particular, conventional mobile devices and wearable devices typically rely on visual feedback via a screen and/or auditory feedback via one or more speakers to convey information to a user. For example, mobile phones typically provide navigation instructions by displaying a graphical map to a user and supplementing the graphical map with auditory navigation instructions.

However, while visual and auditory feedback often are effective in conveying detailed information to a user, in certain situations, a user's visual and/or auditory channels may become information-saturated. In such situations, the user may be unable to effectively receive additional information via his or her visual and/or auditory channels. For example, when a user is communicating via e-mail or text message, or when the user is engaging in a voice conversation, the user's visual or auditory channels may be unable to effectively receive and process additional visual or auditory information, such as the visual and/or auditory navigation instructions described above. Consequently, when the additional visual or auditory information is presented to the user, the information may be ignored by the user or inaccurately perceived by the user.

Further, in some situations, overwhelming a user with additional visual and/or auditory information may distract a user, creating a potentially dangerous situation. For example, when a user is driving a vehicle or navigating on foot, requiring the user to look down at a screen to view navigation instructions requires the user to divert his/her attention away from the act of driving, walking, running, etc. Such diversions reduce the ability of the user to safely avoid obstacles in the surrounding environment, potentially compromising the safety of both the user and those in the surrounding environment.

As the foregoing illustrates, non-visual and non-auditory techniques for providing information to a user would be useful.

SUMMARY

Embodiments of the present disclosure set forth a method for exerting forces on a user. The method includes determining, based on sensor data, at least one of an orientation and a position associated with a user-mounted device. The method further includes computing a force to be exerted on the user via one or more force exerting devices included in the user-mounted device based on a force direction and a force magnitude associated with a force event and at least one of the orientation and the position. The method further includes generating a control signal for the one or more force exerting devices based on the force.

Further embodiments provide, among other things, a system and a non-transitory computer-readable storage medium configured to implement the techniques set forth above.

At least one advantage of the disclosed technique is that information can be provided to a user without overwhelming the user's visual and auditory channels. Accordingly, the user can receive instructions, alerts, and notifications while simultaneously receiving other types of information via his or her visual and/or auditory channels, without creating potentially dangerous situations. Further, by exerting forces on the user in response to changes to the orientation of the force device, the techniques described herein can assist a user in maintaining his or her balance and/or posture.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Figure 1A:
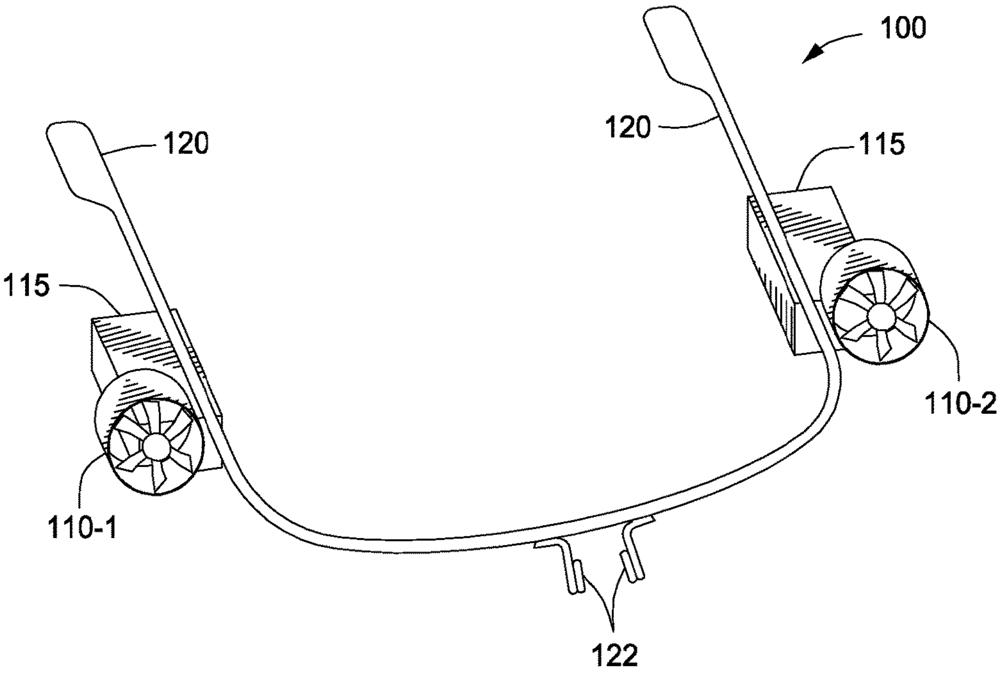
FIGS. 1A-1D illustrate force devices for exerting forces on a user, according to various embodiments.

FIG. 1A illustrates a force device 100 for exerting forces on a user, according to various embodiments. The force device 100 may include, without limitation, one or more fans 110, one or more fan control modules 115, head supports 120, and nose supports 122. The fans 110 are configured to generate thrust in order to exert linear forces and/or rotational forces on the user. In some embodiments, the fans 110 exert forces on the user based on force events that are received and/or generated by the force device 100. For example, and without limitation, a force event received by the force device 100 could specify a type of force (e.g., linear forces, rotational forces, etc.) to be exerted on a user, a direction in which a force is to be exerted, and/or a magnitude of a force to be exerted. In addition, a force event may specify the time at which exertion of a force is to be initiated and/or terminated, a duration of time for which a force is to be exerted, and/or the position and/or orientation of the force device 100 at which the exertion of a force is to be initiated and/or terminated.

In general, force events are intended to communicate various types of information to a user. For example, and without limitation, force events could be generated to communicate navigation instructions to a user, to provide the user with information associated with objects in the surrounding environment, and to provide the user with alert information, such as when someone is attempting to contact the user or when the user is potentially in danger. Additionally, in some embodiments, force events could be generated to communicate other types of information to a user, such as subconscious and/or haptic information (e.g., via a user's vestibular sense), information intended to instruct a user to correct his or her balance or posture, and information intended to cancel out various types of involuntary user movements (e.g., stereotypy).

The fan control modules 115 are configured to coordinate the overall operation of the fans 110. In general, the fan control module(s) 115 operate the fan(s) 110 to generate thrust, which, in turn, generates forces on a user's head and/or body. The exertion of forces on a user may serve a variety of purposes. In some embodiments, slight forces are exerted on a user to indicate that the user should look or move in a particular direction or to draw the user's attention to a particular object or location in the environment. For example, and without limitation, a force could be exerted on a user to indicate that the user should turn left or right to navigate to a particular destination. In another non-limiting example, a force could be exerted on a user to alert the user of a dangerous situation, such as when a vehicle is approaching the user from a certain direction at a high rate of speed. In addition, a series of forces (e.g., a shaking pattern) could be exerted on the user, for example, and without limitation, to indicate that the user has taken a wrong turn or is in a dangerous situation.

In yet another non-limiting example, forces could be exerted on a user to simulate specific actions or experiences, such as when a user is interacting with a virtual reality device. In still another non-limiting example, a force pattern could be used to provide a notification to a user, such as a notification that the user is receiving an incoming phone call. Additionally, a gentle tapping force pattern could be used to provide a more subtle notification—akin to being tapped on the shoulder—such as when a user is listening to music via headphones, and one or more sensors determine that someone is attempting to speak to the user or get the user's attention. Accordingly, the force device 100 enables alternate forms of feedback, directional information, and notifications to be generated for a user.

In some embodiments, the fan control modules 115 are configured to receive force events from other devices (e.g., a smartphone or mobile computer). Additionally, in some embodiments, the fan control modules 115 receive sensor data acquired via one or more sensors (not shown in FIGS. 1A-1D), generate force events based on sensor data, and generate control signals to operate one or more fans 110. For example, and without limitation, when a fan control module 115 receives a force event, the fan control module 115 may query one or more sensors and calculate the necessary force vectors to accommodate the force event given the current position of the user (e.g., the current position of the head of the user). The fan control module 115 then reorients the fans 110, if applicable, and activates the correct fans 110 to exert a force on the user along those vector(s). Once the fans 110 have been activated, the fan control module 115 may monitor the sensors and adjust the fan 110 directions and/or thrust generated by the fan(s) 110, as needed, to continue to exert the desired force. Once the user has reach a desired position and/or orientation, the fan control module 115 may terminate operation of the fan(s) 110 and wait for receipt of the next force event.

Figure 1B:
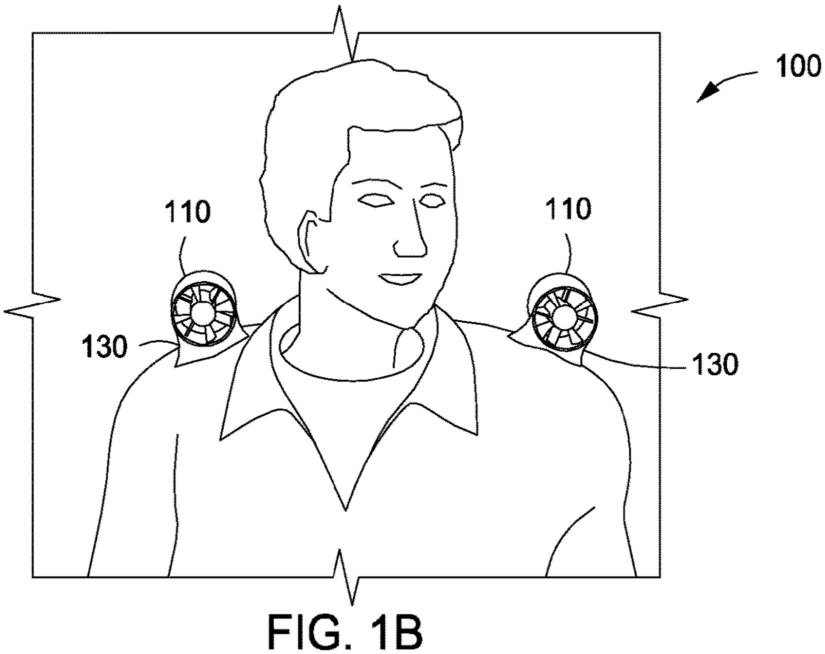

Although various aspects of the force device 100 are described below in conjunction with the head-mounted device of FIG. 1A, the descriptions and techniques provided herein are also applicable to other types of force devices 100 positioned at other locations on a user. For example, and without limitation, as shown in FIG. 1B, the force device 100 could be a shoulder-mounted device that exerts forces on the upper torso of the user via shoulder supports 130. More specifically, the shoulder supports 130 couple one or more fans 110 to one or both shoulders of the user, enabling thrust generated by the fans 110 to exert linear forces and rotational forces (e.g., yaw rotational forces) on the shoulders of the user.

Figure 1C:
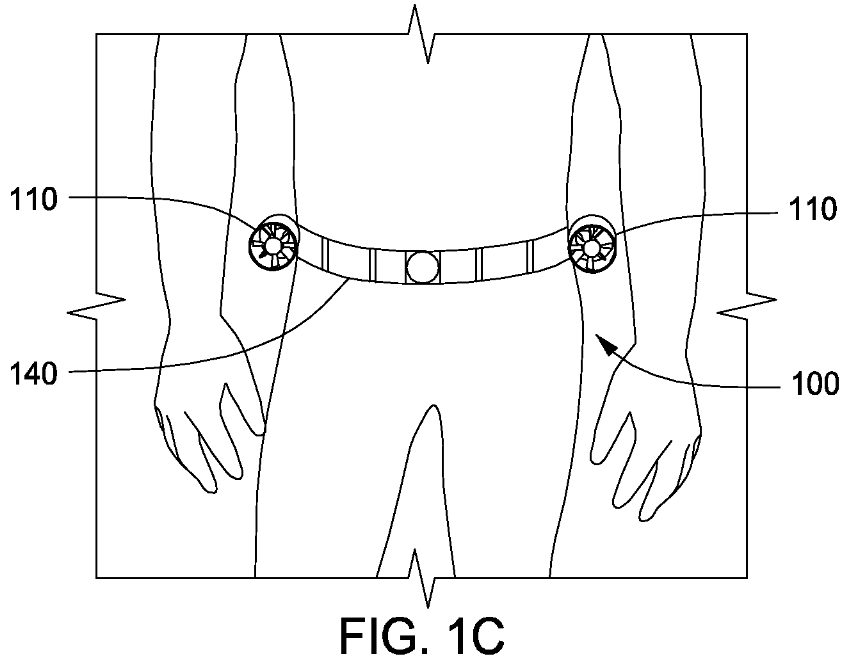
Figure 1D:
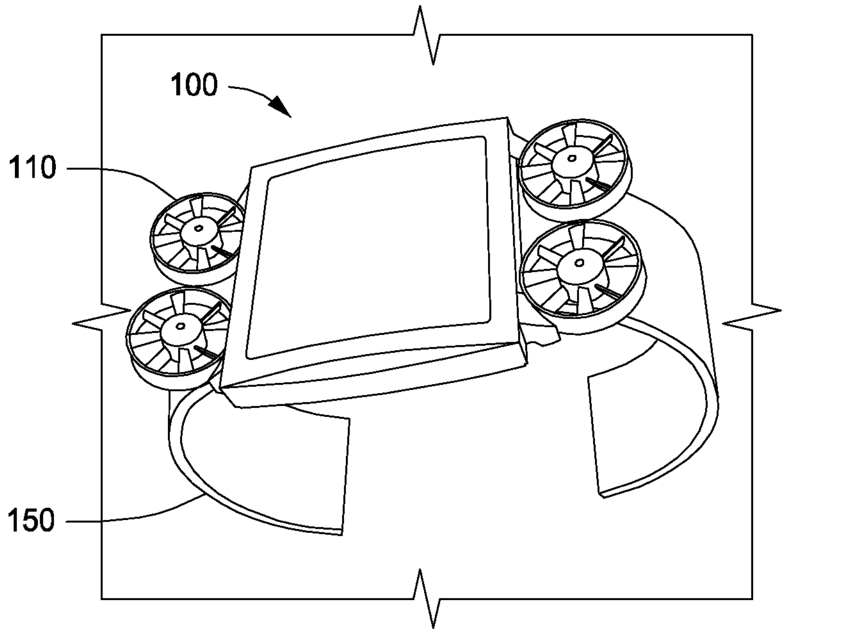

Additionally, as shown in FIG. 1C, the force device 100 could be a waist-mounted device (or a leg-mounted device) that exerts forces on the lower torso (or legs) of the user. More specifically, the waist supports 140 shown in FIG. 1C couple one or more fans 110 to the waist of the user, enabling thrust generated by the fans 110 to exert linear forces and rotational forces on the lower torso of the user. In still other embodiments, the force device 100 could be integrated with other types of wearables in order to exert forces on a user's hand, arm, or other body part. For example, and without limitation, as shown in FIG. 1D, the force device 100 could be integrated with a wristband 150 of a smartwatch. Thus, one or more fans 110 coupled to the wrist of the user via the wristband 150 enable linear forces and rotational forces to be exerted on the wrist of the user. In such embodiments, one or more sensors included in the force device 100 could sense heat and, when the user is about to put his/her hand on a hot object, activate the fans 110 to physically lift the hand away from the hot surface.

Additionally, multiple force devices 100 may be operated in conjunction with one another to exert forces in multiple directions, enabling a fuller range of force directions to be achieved. For example, and without limitation, a first force device 100 could provide forces along the x-axis on a first body part, while a second force device 100 exerts forces along the y-axis on a second body part. Moreover, even when implemented along the same axis/axes, multiple force devices 100 could be used to indicate the importance of an instruction, alert, or notification. For example, and without limitation, a force device 100 integrated with a necklace could exert a subtle force notification to the neck of a user, a force device 100 integrated with a head-worn device could exert a more significant force notification to the head of the user, and both force devices 100 could exert forces when a notification is of importance.

Although the fans 110 shown in FIG. 1A are ducted fans, in other embodiments, the force device 100 may include any other technically feasible type of device that is capable of generating thrust in order to exert a force on a user. In some embodiments, the force device 100 includes micro axial fans, microelectromechanical systems (MEMS) fans, nanoscale fans, propellers, micro turbines, micro propulsion systems, compressed air, etc. For example, and without limitation, the force device 100 could include an array of micro axial fans, MEMS fans, and/or nanoscale fans that, when combined, are capable of exerting a force that is perceivable by a user.

Further, although the fans 110 described herein are shown as being positioned at specific locations and orientations on the force device 100, in other embodiments, the fans 110 may be positioned at other locations and orientations. For example, and without limitation, in some embodiments, one or more surfaces of the force device 100 may be substantially covered with micro axial fans, MEMS fans, nanoscale fans, etc. that can be selectively driven to exert various types of cumulative forces on the user. Examples of alternate locations and orientations of the fans 110 are described below in conjunction with FIGS. 3A-6G.

In various embodiments, the force device 100 includes one or more sensors that track the position and/or orientation of the force device 100 and/or track various aspects of the surrounding environment. The sensor(s) may include, without limitation, global navigation satellite system (GNSS) devices, magnetometers, inertial sensors, gyroscopes, accelerometers, visible light sensors, thermal imaging sensors, laser based devices, ultrasonic sensors, infrared sensors, radar sensors, and/or depth sensors, such as time-of-flight sensors, structured light sensors, etc. These sensor(s) may enable the position of the force device 100 to be tracked in absolute coordinates (e.g., GPS coordinates) and/or relative to objects in the surrounding environment.

In some embodiments, the sensor(s) are disposed in the fan control module(s) 115. Data acquired by the sensor(s) could then be used to generate force events within the force device 100 or the sensor data may be transmitted to a separate device for analysis. In the same or other embodiments, one or more of the sensors may be disposed within an auxiliary device, such as a smartphone, mobile computer, wearable device, etc.

Figure 2:
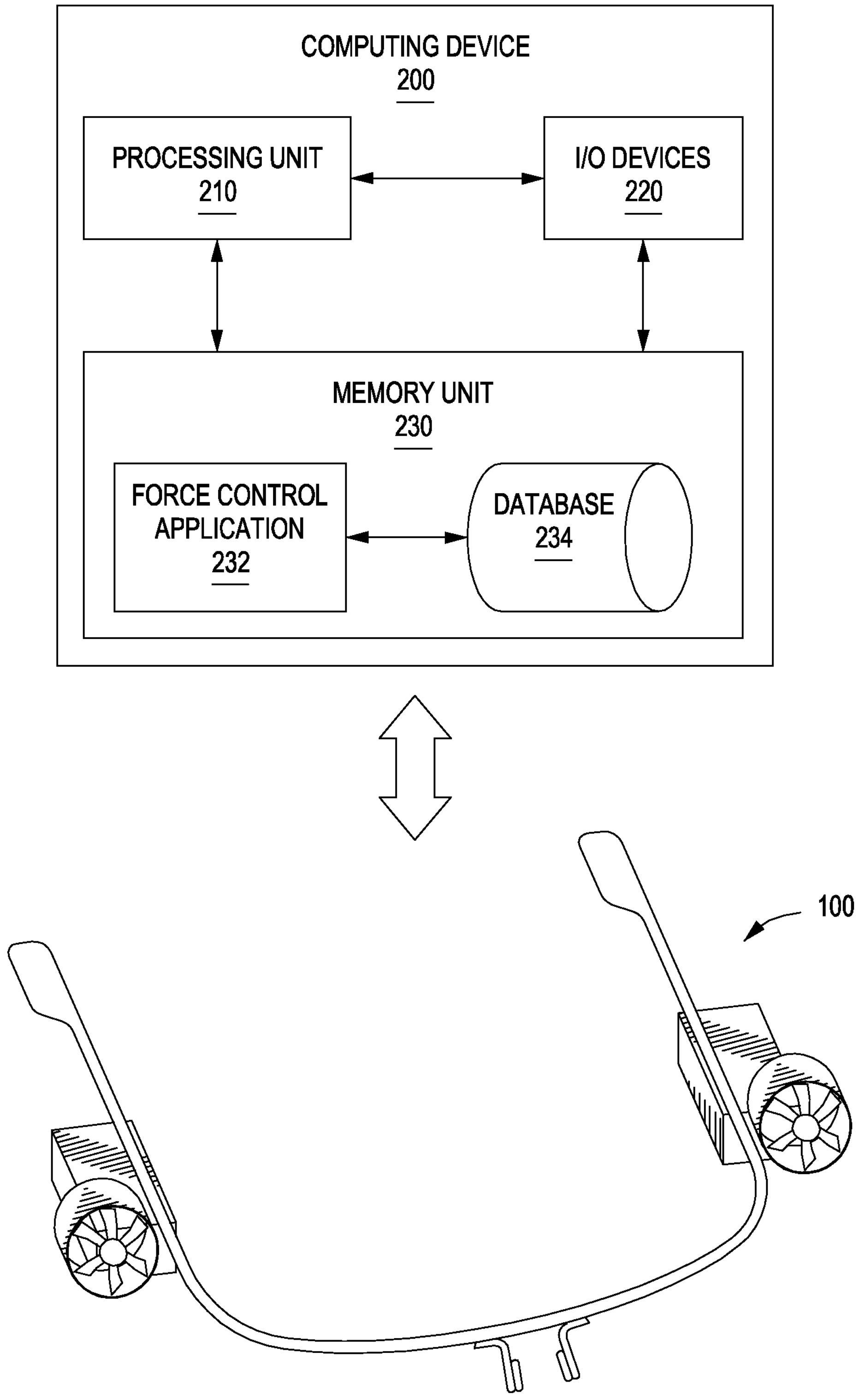
FIG. 2 is a block diagram of a computing device that may be implemented in conjunction with or coupled to the force device of FIG. 1A, according to various embodiments.

FIG. 2 is a block diagram of a computing device 200 that may be implemented in conjunction with or coupled to the force device 100 of FIG. 1A, according to various embodiments. As shown, computing device 200 includes, without limitation, a processing unit 210, input/output (I/O) devices 220, and a memory device 230. Memory device 230 includes a force control application 232 configured to interact with a database 234.

Processing unit 210 may include a central processing unit (CPU), digital signal processing unit (DSP), and so forth. In various embodiments, the processing unit 210 is configured to analyze sensor data acquired by one or more sensors to determine the position and/or orientation of the force device 100 and/or to detect and/or identify objects in the surrounding environment. In some embodiments, the processing unit 210 is further configured to determine the position and/or orientation of the force device 100 relative to the surrounding environment and/or to receive and/or generate force events that are based on the position and/or orientation of the force device 100 and/or objects in the surrounding environment. For example, and without limitation, the processing unit 210 could execute the force control application 232 to analyze sensor data, determine that the force device 100 has a particular orientation and position, and generate a force event intended to cause the user to modify the orientation and position by exerting force(s) on the user via the fan(s) 110. The processing unit 210 could further generate control signals (e.g., via the force control application 232) that cause the fan(s) 110 to exert forces on the user until the force device 100 reaches a desired orientation and/or position.

I/O devices 220 may include input devices, output devices, and devices capable of both receiving input and providing output. For example, and without limitation, I/O devices 220 may include wired and/or wireless communication devices that send data to and/or receive data from the sensor(s) included in the force device 100. Additionally, the I/O devices 220 may include one or more wired or wireless communication devices that receive force events (e.g., via a network, such as a local area network and/or the Internet) that cause the fan(s) 110 to exert forces on the user. The I/O devices 220 may further include fan motor controllers, such as electronic speed controllers (ESCs) and actuator controllers for re-orienting the thrust vector of the fans 110.

Memory unit 230 may include a memory module or collection of memory modules. Force control application 232 within memory unit 230 may be executed by processing unit 210 to implement the overall functionality of the computing device 200, and, thus, to coordinate the operation of the force device 100 as a whole. The database 234 may store digital signal processing algorithms, navigation data, object recognition data, force event data, and the like.

Computing device 200 as a whole may be a microprocessor, an application-specific integrated circuit (ASIC), a system-on-a-chip (SoC), a mobile computing device such as a tablet computer or cell phone, a media player, and so forth. In some embodiments, computing device 200 is integrated in the fan control module(s) 115 associated with the force device 100. Generally, computing device 200 may be configured to coordinate the overall operation of the force device 100. In other embodiments, the computing device 200 may be coupled to, but separate from the force device 100. In such embodiments, the force device 100 may include a separate processor that receives data (e.g., force events) from and transmits data (e.g., sensor data) to the computing device 200, which may be included in a consumer electronic device, such as a smartphone, portable media player, personal computer, wearable device, and the like. However, the embodiments disclosed herein contemplate any technically feasible system configured to implement the functionality of the force device 100.

Figure 3A:
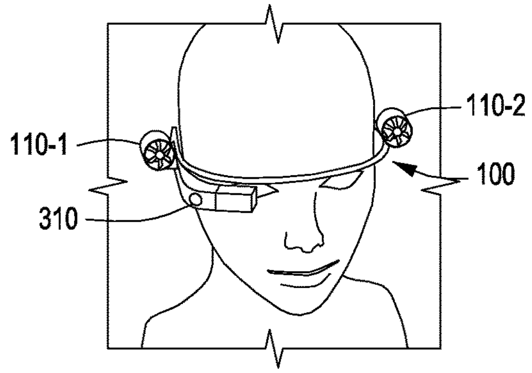
FIGS. 3A-3D illustrate different orientations at which the fans of a force device can be positioned when exerting forces on a user, according to various embodiments.
Figure 3B:
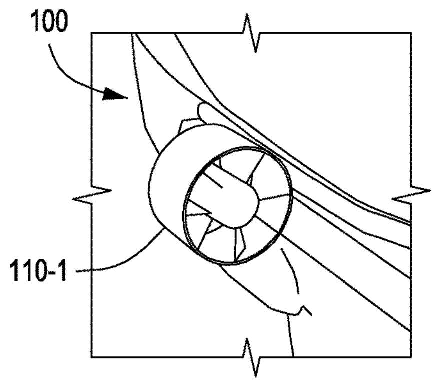
Figure 3C:
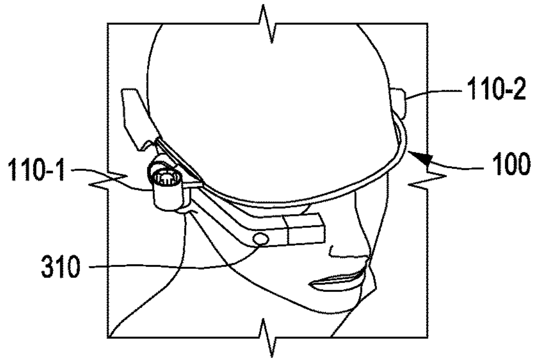
Figure 3D:
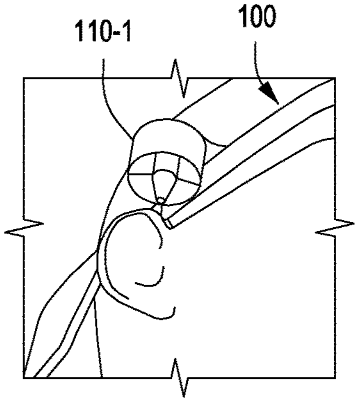

FIGS. 3A-3D illustrate different orientations at which the fans 110 of a force device 100 can be positioned when exerting forces on a user, according to various embodiments. As shown, FIGS. 3A and 3B illustrate an embodiment in which the fans 110 are oriented horizontally relative to a vertical axis that corresponds to the neck of the user. FIGS. 3C and 3D illustrate an embodiment in which the fans 110 are oriented vertically. As described above and shown in FIGS. 3A and 3C, the force device 100 may include one or more sensors 310 capable of tracking the position and/or orientation of the force device 100 and/or capable of tracking various aspects of the surrounding environment.

When the fans 110 are oriented in the manner shown in FIGS. 3A and 3B, thrust generated by the fans 110 is capable of exerting linear forces and rotational forces (e.g., yaw rotational forces) on the head of the user. For example, and without limitation, when both fan 110-1 and fan 110-2 generate thrust in the direction in which the user is facing, a forward force is exerted on the head of the user. In various embodiments, a forward force may be generated by the force device 100 in order to instruct the user to move in a forward direction, to direct the user's interest towards an object located in front of the user, and/or to simulate an action or experience in which the head of the user would be pushed or pulled forward. In addition, the magnitude of the forward force may be proportional to the distance that the user should move in a forward direction, the importance of an object located in front of the user, or the degree to which the action or experience, such as gravity or another type of acceleration, would push or pull the head of the user. For example, and without limitation, exerting a high magnitude of linear force via the force device 100 could indicate to the user that he or she should move forward for relatively long distance, whereas exerting a lower magnitude of force via the force device 100 could indicate that the user should move forward for relatively short distance.

By contrast, when both fan 110-1 and fan 110-2 in FIGS. 3A and 3B generate thrust away from the direction in which the user is facing, a backward force is exerted on the head of the user. In various embodiments, a backward force may be generated by the force device 100 in order to instruct the user to step backwards, to instruct the user to turn 180°, to direct the user's interest towards an object located behind the user, to prevent the user from colliding with an object he or she is approaching, and/or to simulate an action or experience in which the head of the user would be pushed or pulled backwards. Further, the magnitude of the backward force may be proportional to the distance for which the user should move in a backward direction (e.g., by turning 180° and walking forward), the importance of an object located behind the user, or the degree to which the action or experience would push or pull the head of the user backwards. Further, the magnitude of the forward force or the backward force may be based on a magnitude of movement required for the user to correct his or her posture, such as the distance a user should move his or her shoulders and/or back to properly align the spine of the user.

Additionally, in FIGS. 3A and 3B, when fan 110-1 and fan 110-2 generate thrust in different directions or when only one of the fans 110-1, 110-2 is generating thrust, either a left turning force or a right turning force is exerted on the head of the user. In various embodiments, a left turning force or a right turning force may be generated by the force device 100 in order to instruct the user to navigate to the left or to the right, to direct the user's interest towards an object located to the left or to the right of the user, and/or to simulate an action or experience in which the head of the user would be rotated to the left or to the right. In addition, the magnitude of the left turning force or the right turning force may be proportional to the distance the user should move to the left or to the right, how much the user should rotate to the left or to the right (e.g., a certain number of degrees), the importance of an object located to the left or to the right of the user, or the degree to which the action or experience would push or pull the head of the user to the left or to the right. For example, and without limitation, exerting a high magnitude of rotational force via the force device 100 could indicate to the user that he or she should rotate to the left or to the right quickly, with a relatively small turning radius, and/or a relatively large number of degrees, whereas exerting a low magnitude of rotational force could indicate that the user should rotate to the left or to the right slowly, with a relatively large turning radius, and/or a relatively small number of degrees.

When the fans 110 are oriented in the manner shown in FIGS. 3C and 3D, thrust generated by the fans 110 is capable of exerting linear forces and rotational forces (e.g., roll rotational forces) on the head of the user. For example, and without limitation, when both fan 110-1 and fan 110-2 generate thrust in a direction towards the top of the user's head, an upward force is exerted on the head of the user, making the force device 100 feel lighter to the user. By contrast, when both fan 110-1 and fan 110-2 in FIGS. 3C and 3D generate thrust in a direction towards the shoulders of the user, a downward force is exerted on the head of the user.

In various embodiments, an upward force or a downward force may be generated by the force device 100 in order to instruct the user to navigate to a higher story of a building or to a lower story of a building, respectively, to direct the user's interest towards an object located above or below the user, and/or to simulate an action or experience in which the head of the user would be pushed or pulled upward or downward. Further, the magnitude of the upward force or downward may be proportional how many flights of stairs the user should climb or descend, the importance of an object located above or below the user, or the degree to which the action or experience would push or pull the head of the user upwards or downwards. For example, and without limitation, if the force device 100 is instructing a user to climb the stairs to the top of a tall building, then the force device 100 could exert a high magnitude of force on the user to indicate that he or she should climb up a large number of flights of stairs. Then, after the user has climbed one or more flights of stairs towards the top of the building, the force device 100 could exert a lower magnitude of force to indicate that the user has fewer flights of stairs to climb to reach the top of the building.

Additionally, in FIGS. 3C and 3D, when fan 110-1 and fan 110-2 generate thrust in different directions, either a left tilting force or a right tilting force is exerted on the head of the user. In various embodiments, a left tilting force or a right tilting force may be generated by the force device 100 in order to instruct the user to navigate to the left or to the right, to direct the user's interest towards an object located to the left or to the right of the user, to correct the posture of a user that is leaning to the left or to the right, and/or to simulate an action or experience in which the head of the user would be pushed or pulled to the left or to the right. In addition, the magnitude of the left tilting force or the right tilting force may be proportional to the distance for which the user should navigate to the left or to the right, how many degrees the user should turn to the left or to the right, the importance of an object located to the left or to the right of the user, or the degree to which the action or experience would push or pull the head of the user to the left or to the right. Further, the magnitude of the left tilting force or the right tilting force may be based on (e.g., proportional to) a magnitude of movement required for the user to correct his or her posture, such as the distance a user must shift his or her center-of-gravity to maintain his or her balance.

In some embodiments, the force device 100 may exert a force having a magnitude intended to affect the head of the user or a force having a larger magnitude that is intended to affect the overall balance of the user, thereby causing the body of the user to move in a specific direction. For example, whereas a relatively small force affects only the head of the user, a larger force may influence the user's entire body. In the first technique, the user may perceive a slight force to their head and interpret the force as a hint to direct their attention towards a certain direction. By contrast, in the second technique, the user may perceive a force that is applied to the head as instead being applied to their entire body (e.g., due to lateral flexion of the neck or spine) and interpret the force as an instruction to walk or navigate in a certain direction.

In some embodiments, the fans 110 can be dynamically reoriented between the orientations shown in FIGS. 3A and 3B and the orientations shown in FIGS. 3C and 3D, as well as any intermediate orientations, in order to modify the direction in which force is exerted on the user. For example, and without limitation, the fans 110 may be coupled to the force device 100 via one or more actuators that are capable of panning and/or tilting the fans 110 to reorient the fans 110 relative to the force device 100. Such actuators may include electric motors, piezoelectric motors, hydraulic actuators, pneumatic actuators, or any other technically feasible type of actuator. In some embodiments, the actuators are capable of turning and rotating the fans 110 in any desired direction, both vertically and horizontally. For example, and without limitation, one or more fans 110 could be mounted on a set of concentric rings (e.g., gimbals) that are pivotably coupled to one another along different axes (e.g., two or more axes disposed at right angles from one another). Accordingly, in such embodiments, the fans 110 could be oriented to exert forces on the user in a variety of directions. In other embodiments, the fans 110 are coupled to actuators that are capable of only panning or tilting, such that the orientation of the fans 110 can be changed around a single axis.

Figure 4A:
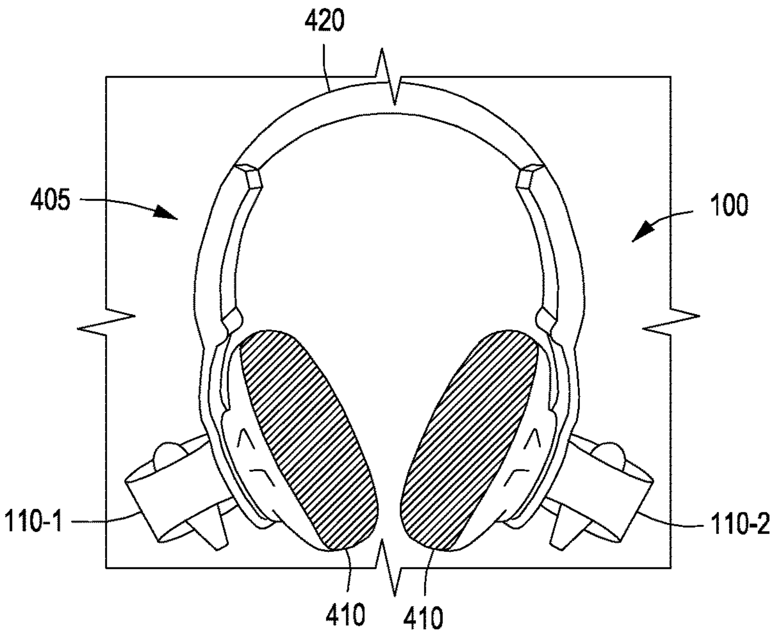
FIGS. 4A and 4B illustrate a force device implemented in conjunction with a pair of headphones, according to various embodiments.
Figure 4B:
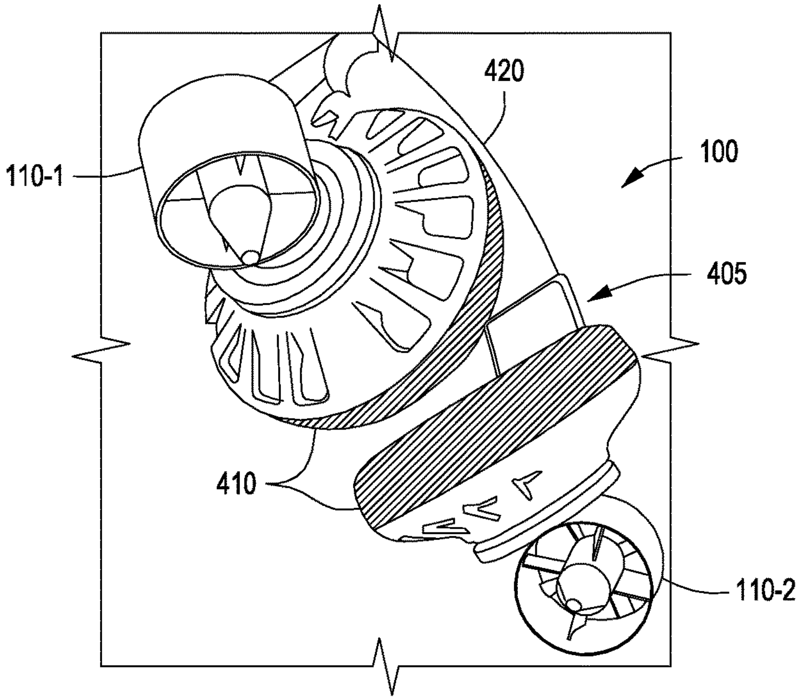

FIGS. 4A and 4B illustrate a force device implemented in conjunction with a pair of headphones, according to various embodiments. As shown, the force device 100 may be a standalone device, or the force device 100 may be integrated with another device, such as a pair of headphones 405, earbuds, bone-conducting speakers, a head mounted display, a smartphone, a virtual reality device, etc. When integrated with a pair of headphones 405, the force device 100 may include loudspeakers 410, a head support 420, and one or more fans 110 coupled to the loudspeakers 410.

In general, noise is generated when the fan(s) 110 are driven at high speeds. Accordingly, in some embodiments, passive and/or active noise cancellation may be implemented to reduce the degree to which a user can hear noise produced by the fan(s) 110. For example, and without limitation, fan control module(s) 115 that operate the fan(s) 110 may implement active noise cancellation by detecting fan noise, processing the fan noise to generate an inverse signal, and transmitting the inverse signal to the ear(s) of the user.

Additionally, in some embodiments, multiple fans 110 may be implemented to provide force along substantially the same axis, reducing the fan speed required for each fan 110 and, consequently, reducing the overall noise of the fans 110. Other techniques for reducing fan noise without sacrificing force include enclosing the fan blades in a tube out of which air is blown and/or implementing Helmholtz cavities to damp noise. Further, when using MEMS fans or nanoscale fans, noise may be nearly unperceivable, even when multiple fans are operating simultaneously.

Figure 5:
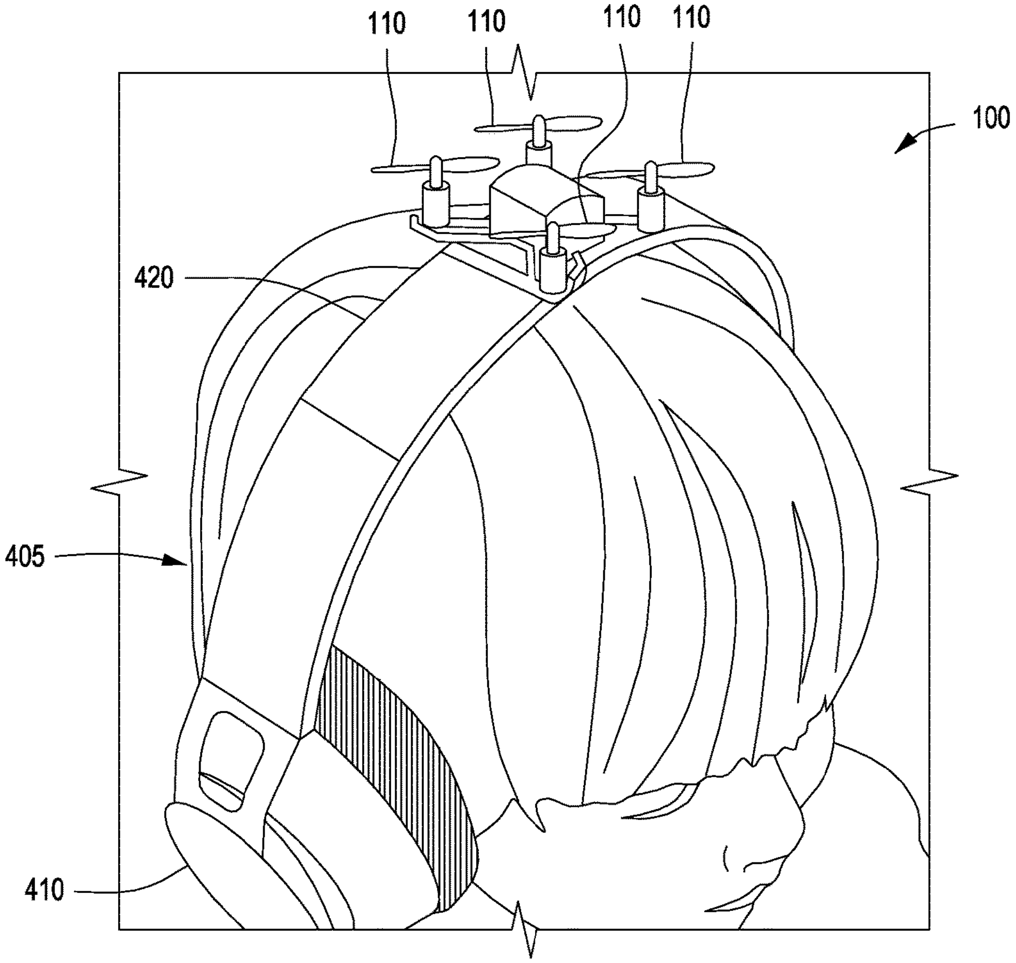
FIG. 5 illustrates a rectangular configuration of fans coupled to a top portion of the head support of another force device, according to various embodiments.

Although the force device 100 shown in FIGS. 4A and 4B includes fans 110 coupled to the loudspeakers 410, other embodiments may include any type and number of fans 110 coupled to other portions of the force device 100. For example, and without limitation, one or more fans 110 may be coupled to the head support 420, as shown in FIG. 5, which illustrates a rectangular configuration of fans 110 coupled to a top portion of the head support 420 of another force device 100, according to various embodiments. In some embodiments, the rectangular configuration of fans 110 is operated in a manner similar to the operation of a quadcopter. Accordingly, a variety of linear and rotational forces can be exerted on the user, such as the exemplary linear and rotational forces described herein with respect to FIGS. 3A-3D and 6A-6G.

Figure 6A:
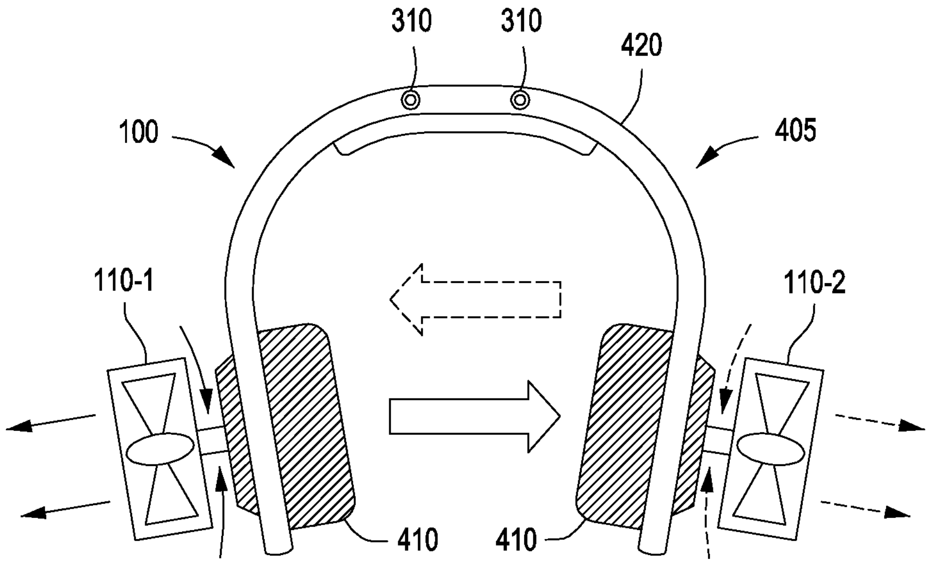
FIGS. 6A-6G illustrate various fan configurations and associated modes of operation that may be implemented with a force device, according to various embodiments.

FIGS. 6A-6G illustrate various fan 110 configurations and associated modes of operation that may be implemented with a force device 100, according to various embodiments. As shown in FIG. 6A, fans 110 may be coupled to the force device 100 in a horizontal configuration that enables the fans 110 to exert left and right forces on the user. Additionally, the fans 110 may be operated simultaneously to exert a compressive force on the user. In some embodiments, the housing of the loudspeakers 410 includes perforations that permit air to flow to the fans 110 through the top, bottom, and/or sides of housing. Such configurations also may be implemented to cool the user's ears.

Figure 6B:
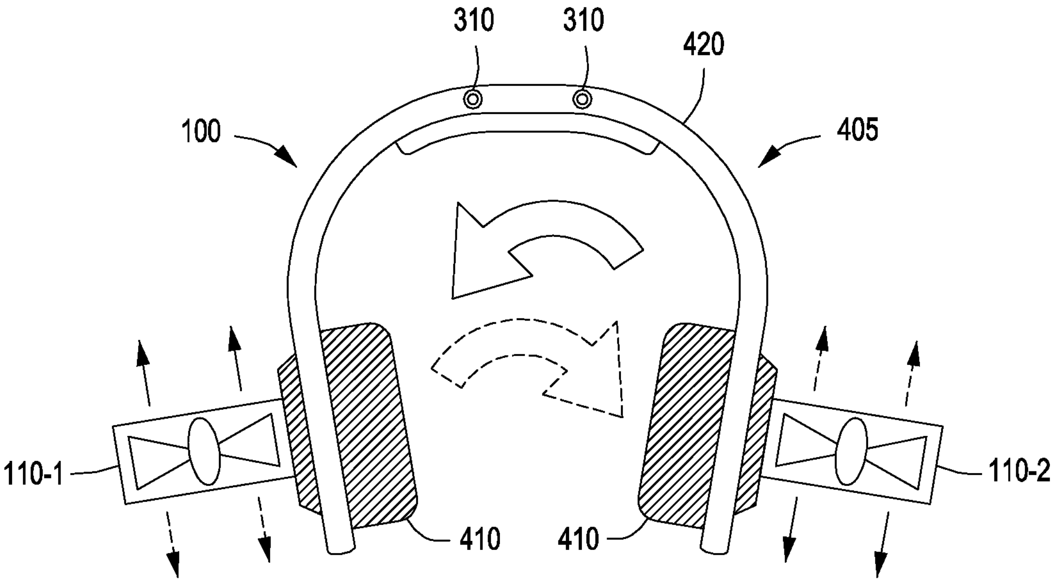

As shown in FIG. 6B, fans 110 may be coupled to the force device 100 in a vertical configuration that enables the fans 110 to exert left tilting forces and right tilting forces (e.g., roll rotational forces) on the user. Additionally, when the fans 110 are operated to generate thrust in substantially the same direction, substantially upward forces and substantially downward forces may be exerted on the user.

Figure 6C:
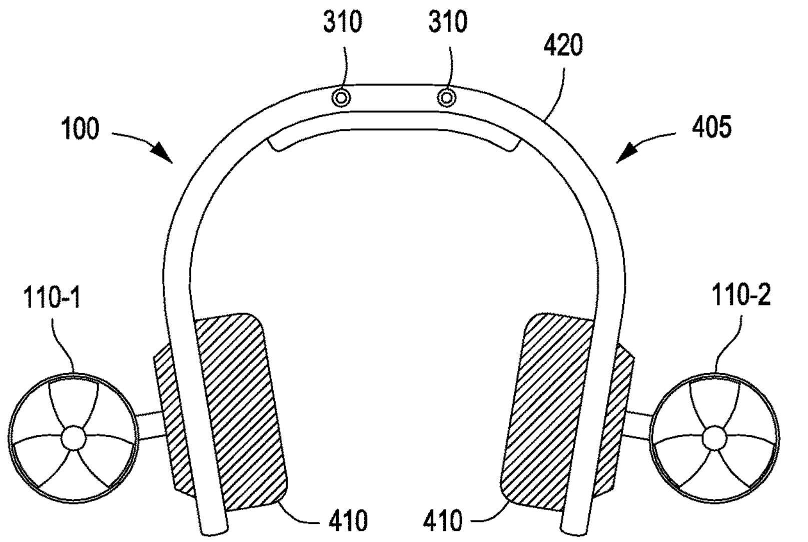
Figure 6D:
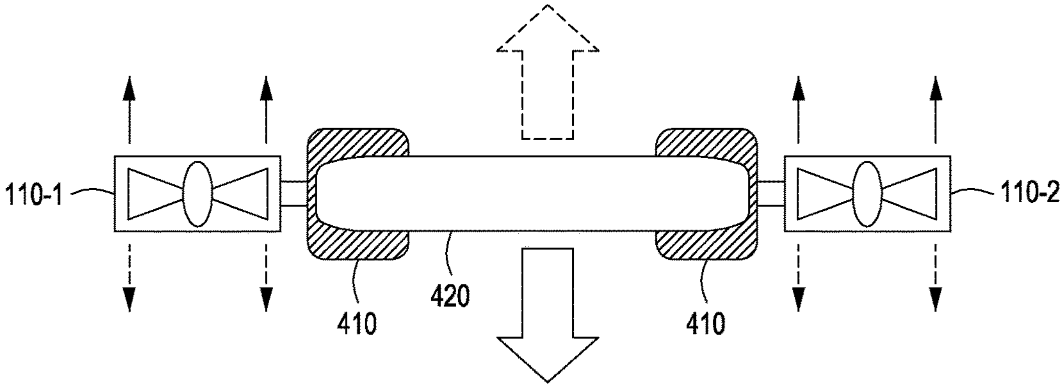
Figure 6E:
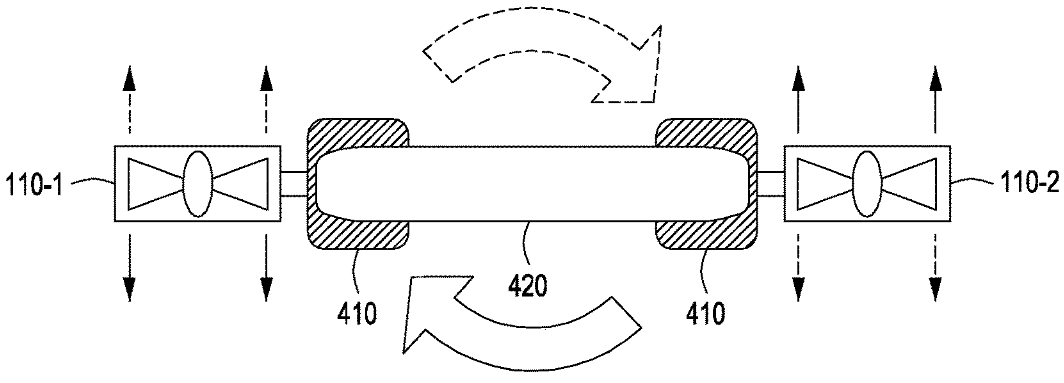

With reference to FIGS. 6C-6E, the fans 110 may be coupled to the force device 100 in a horizontal configuration that enables the fans 110 to exert left turning forces and right turning forces (e.g., yaw rotational forces) on the user. Such forces are depicted in the top view of the force device 100 shown in FIG. 6E. Additionally, when the fans 110 are operated to generate thrust in substantially the same direction, forward forces and backward forces may be exerted on the user, as depicted in the top view of the force device 100 shown in FIG. 6D.

Figure 6F:
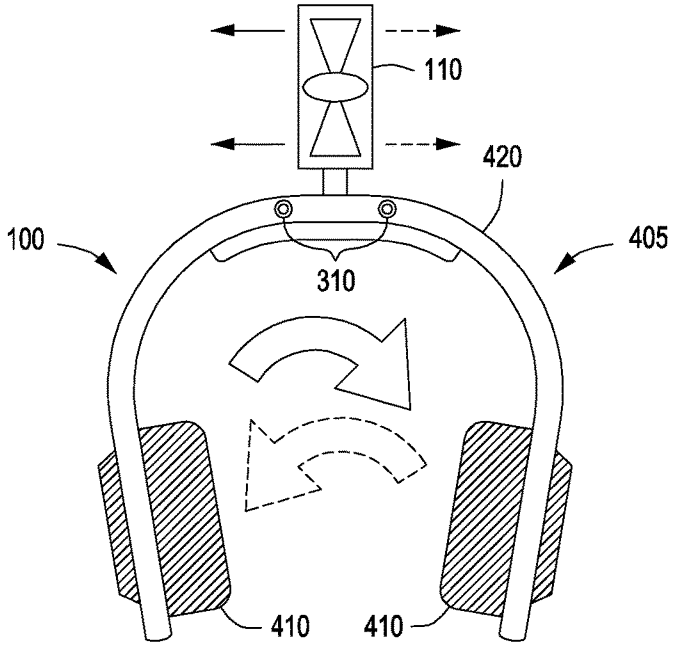

As shown in FIG. 6F, a fan 110 may be coupled to the top of the head support 420 of the force device 100. When the fan 110 is orientated in the manner shown in FIG. 6F, the fan 110 is able to exert left tilting forces and right tilting forces on the user. Additionally, when the fan 110 is rotated 90° around a vertical axis, the fan 110 is able to exert forward tilting forces and backward tilting forces on the user.

Figure 6G:
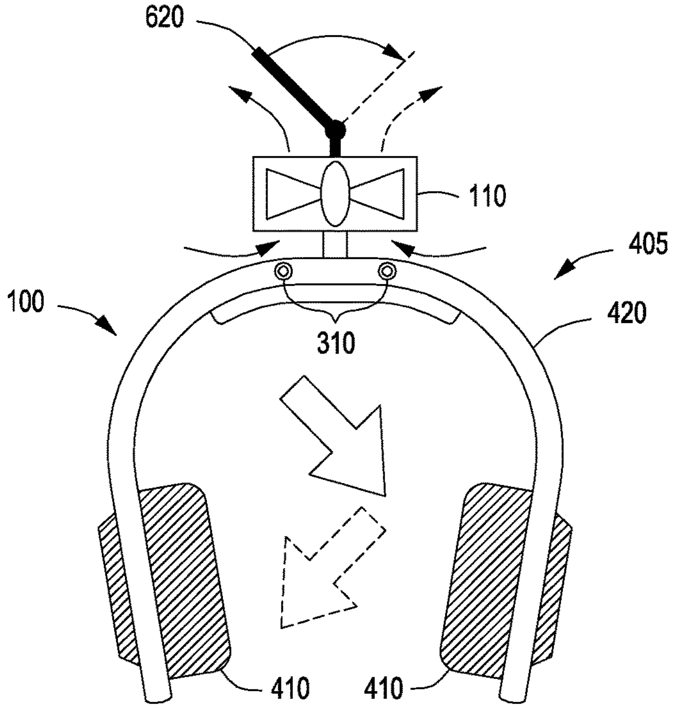

As shown in FIG. 6G, a fan 110 may be coupled to top of the head support 420 of the force device 100 in a vertical configuration. Such a configuration enables the fan 110 to exert a downward force on the user. Additionally, in some embodiments, a flap 620 may be implemented with the fan 110 to control the direction of the airflow and, thus, the direction of the thrust generated by the fan 110. Accordingly, the direction of the force exerted on the user may be dynamically controlled. For example, and without limitation, the flap 620 may be positioned as shown in FIG. 6G to direct airflow up and to the left, causing the fan 110 to exert a force directed down and to the right. In some embodiments, such forces are a combination of both linear forces and rotational forces, depending on the location of the fan(s) 110 and the direction of the force relative to the user.

In various embodiments, the orientations and/or locations of the fans 110 illustrated herein may be dynamically modified to change the type and/or direction of forces exerted on the user. For example, and without limitation, the orientation and/or location of one or more fans 110 illustrated herein may be modified via one or more of the pan-tilt actuators described above. Additionally, any of the fan 110 configurations and techniques described herein may be combined. For example, and without limitation, fans 110 having both horizontal orientations and vertical orientations may be included in the force device 100.

Further, in some embodiments, one or more the fans 110 described herein may include fan blades having a pitch that is dynamically variable. In such embodiments, the pitch of the fan blades may be modified to change the direction of thrust generated by the fan 110, enabling the force device 100 to quickly change the direction of the force being exerted on the user without needing to reverse the rotation of the fan motor.

As shown in FIGS. 6A-6G, the force device 100 may include one or more sensors 310 capable of tracking the position and/or orientation of the force device 100 and/or tracking various aspects of the surrounding environment. As described above, in various embodiments, the sensors 310 may be used for navigational purposes. For example, and without limitation, a user that is walking or jogging could execute a navigation application on a smartphone, and the smartphone could be paired with a force device 100 integrated with a pair of 405 headphones. Then, instead of disrupting the user's music with navigation instructions, the force device 100 could exert forces (e.g., linear forces and/or rotational forces) when the user needs to turn down a particular street. For example, and without limitation, the force device 100 could monitor the position of the user and, when the user needs to turn right, the force device 100 could generate a right turning force or a right tilting force to nudge the user's head to the right. After turning down the correct street, the force device 100 could terminate the force. In addition, when the user arrives at his or her destination, the force device 100 could generate a specific force pattern to indicate that the user has reached his or her destination.

In a non-limiting example, various types of force devices 100, such as those described above, could be integrated with a safety device, such as a system that identifies potential dangers in the surrounding environment and issues alerts to warn a user of the potential dangers. In such embodiments, the force device 100 could analyze the user's surroundings via the sensors 310 and detect potential dangers. Then, when the force device 100 detects a dangerous condition, the force device 100 could apply a force to cause the user to turn his or her head towards the dangerous condition, such as a car pulling out of a driveway.

In another non-limiting example, the force device 100 could be integrated with a head-worn surround (e.g., hemispheric) imager that captures a 360° panorama around the user, or any other sensor that captures information associated with the environment surrounding the user. For example, and without limitation, an imager or sensor could identify a bird in a tree located behind the user. The force device 100 could then exert a force (e.g., an up and to the right force) on the user to indicate that the user—an avid birder—should direct his or her gaze up and to the right.

In yet another non-limiting example, the force device 100 could be integrated with an augmented reality (AR) head-mounted device (HMD). As a user walks down a street and operates the force device 100, the HMD could display various AR information associated with objects in the surrounding environment. Then, when an object associated with AR information is outside of the user's field of view, the force device 100 could exert a force to direct the user's attention towards the object. For example, and without limitation, the force device 100 could include a GPS sensor 310 that determines the user is passing by an apartment building with a noteworthy apartment on the third floor. In response, the force device 100 could exert a force instructing the user to direct his or her gaze up so that AR information associated with the apartment could be provided to the user.

In yet another non-limiting example, the force device 100 could include gyroscopic sensors, accelerometers, and/or imagers to detect when a user stumbles or loses his or her balance. In such a situation, the force device 100 could exert one or more forces to the head or body of the user to attempt to prevent the user from falling and/or to correct the user's balance. For example, and without limitation, one or more sensors included in the force device 100 may detect that the posture of the user is outside of a threshold range (e.g., an angular range). In response, the force device 100 could exert one or more forces to influence the posture of the user until the posture is back within the threshold range. Additionally, forces could be exerted on the head or body of the user when the force device 100 detects via one or more sensors 310 that the user is about to walk into an object, such as a light pole or fire hydrant.

In some embodiments, the force device 100 could provide alerts for subconscious body movements, commonly referred to as stereotypy, being performed by the user. Stereotypy may include repetitive movements, postures, or utterances, such as body rocking, self-caressing, crossing/uncrossing of legs, and marching in place. Accordingly, gyroscopic sensors, accelerometers, imagers, etc. could be implemented to detect such movements and exert a force to bring the movements to the attention of the user. Additionally, the force device 100 could exert forces to compensate for slight movements of the user's head or body that the user would like to cancel out. In such embodiments, the force device 100 could recognize an involuntary body movement pattern and generate a force pattern having substantially the same magnitude, but opposite phase/direction, in order to cancel out the undesired body movement pattern.

Figure 7:
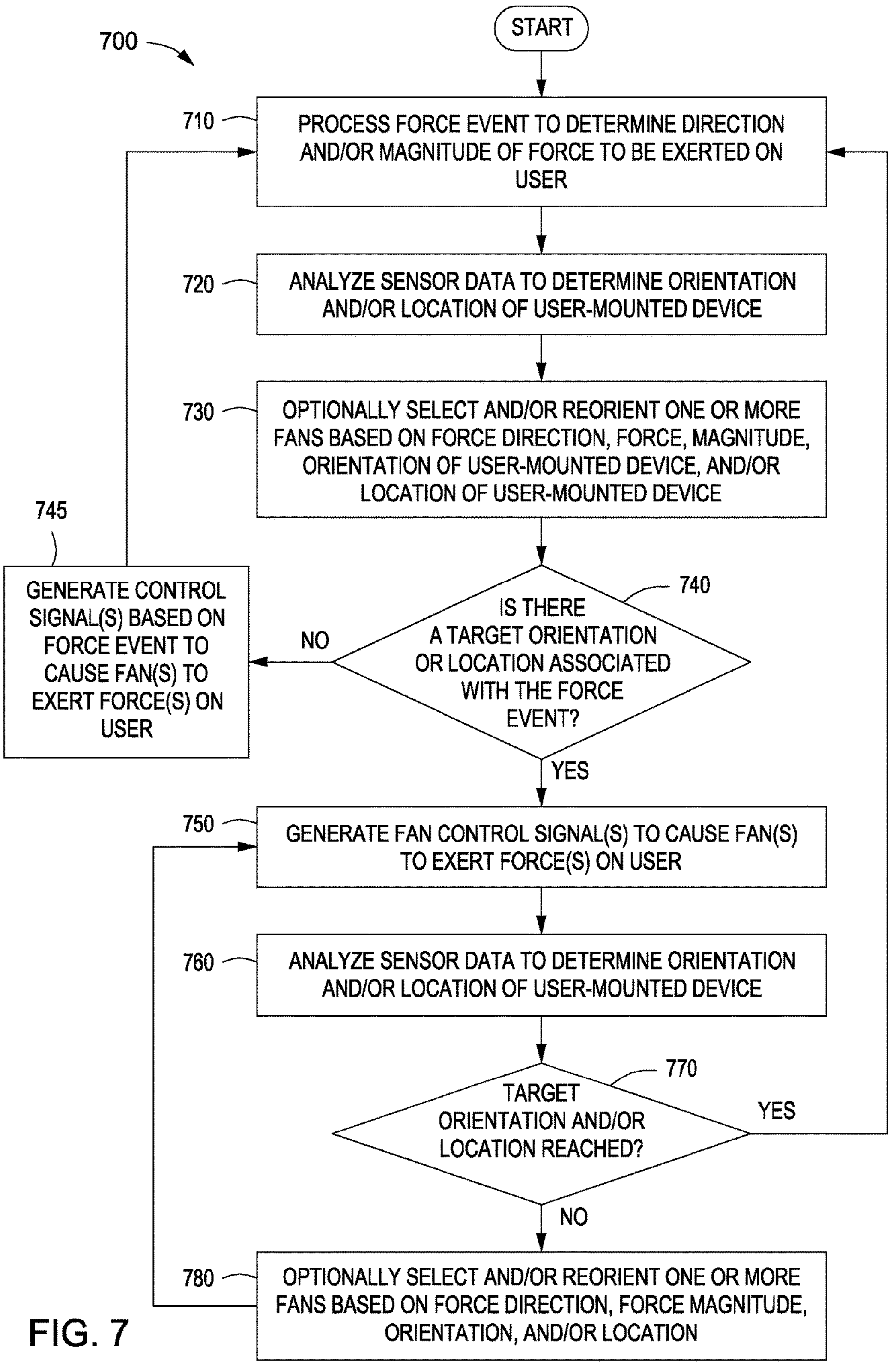
FIG. 7 is a flow diagram of method steps for exerting forces on a user to communicate information to the user, according to various embodiments.

FIG. 7 is a flow diagram of method steps for exerting forces on a user to communicate information to the user, according to various embodiments. Although the method steps are described in conjunction with the systems of FIGS. 1-6G, persons skilled in the art will understand that any system configured to perform the method steps, in any order, falls within the scope of the various embodiments.

As shown, a method 700 begins at step 710, where the force control application 232 receives or generates a force event and processes the force event to determine a force direction, such as a linear force or a rotational force, and/or a force magnitude. As described above, forces of various types and magnitudes may be generated in order to provide instruction, alerts, notifications, etc. to the user. In some embodiments, the force direction indicated by the force event may include a direction relative to the user, or the force direction may include an absolute direction (e.g., based on geographic cardinal directions).

At step 720, the force control application 232 analyzes sensor data to determine the orientation and/or position (e.g., relative coordinates or absolute coordinates) of the force device 100. In various embodiments, the orientation and/or position of the force device 100 may indicate how the fan(s) 110 should be oriented in order to generate a force having a direction and/or magnitude specified by the force event. Additionally, when the force device 100 includes multiple fans 110, the orientation and/or position of the force device 100 may indicate which fans 110 should be selected and triggered to generate a force having a direction and/or magnitude specified by the force event. Accordingly, at step 730, the force control application 232 optionally selects and/or reorients one or more fans 110 based on the force direction indicated by the force event, the force magnitude indicated by the force event, the orientation of force device 100, and/or the position of force device 100.

Next, at step 740, the force control application 232 determines whether a target orientation or position is specified by the force event. In some embodiments, a target orientation may include a threshold range (e.g., an angular range or distance range) associated with the user's posture, head orientation, body orientation, etc. Additionally, in some embodiments, a target position may include GPS coordinates. If no target orientation or target position is specified by the force event, then the method 700 proceeds to step 745, where the force control application 232 generates one or more control signals to cause the fan(s) 110 to exert one or more forces on the user in accordance with the force event. The method 700 then returns to step 710, where the force control application 232 waits to receive or generate an additional force event.

If, however, at step 740, a target orientation or a target position is specified by the force event, then the method 700 proceeds to step 750, where the force control application 232 generates one or more control signals to cause the fan(s) 110 to exert one or more forces on the user in accordance with the force event. Then, at step 760, the force control application 232 analyzes the sensor data to detect the orientation and/or the position of the force device 100. At step 770, the force control application 232 determines whether the user has complied with and/or properly responded to the force(s) by determining whether the force device 100 is in the target orientation and/or at the target position.

If, at step 770, the force control application 232 determines that the force device 100 is not in the target orientation and/or not at the target position, then the method 700 proceeds to step 780, where the force control application 232 again optionally selects and/or reorients one or more fans 110 based on the force direction indicated by the force event, the force magnitude indicated by the force event, the orientation of force device 100, and/or the position of force device 100. The method 700 then returns to step 750, where the force control application 232 generates one or more control signals to cause the fan(s) 110 to exert one or more additional forces on the user.

If, however, at step 770, the force control application 232 determines that the force device 100 is in the target orientation and/or at the target position, then the method 700 returns to step 710, where the force control application 232 waits to receive or generate an additional force event.

In sum, the force control application receives or generates a force event indicating a force direction and/or a force magnitude. The force control application then determines, based on sensor data, the orientation and/or the position of the force device. The force control further determines a force to be exerted on the user based on the force event as well as the orientation and/or the position of the force device. Next, the force control application generates one or more fan control signals to cause one or more forces to be exerted on the user.

At least one advantage of the techniques described herein is that information can be provided to a user without overwhelming the user's visual and auditory channels. Accordingly, the user can receive instructions, alerts, and notifications while simultaneously receiving other types of information via his or her visual and/or auditory channels, without creating potentially dangerous situations. Further, by exerting forces on the user in response to changes to the orientation of the force device, the techniques described herein can assist a user in maintaining his or her balance and/or posture.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for exerting forces on a user, the system comprising:

a user-mounted device including one or more airflow generating devices, wherein each of the one or more airflow generating devices is configured to exert forces on the user by generating thrust;

one or more sensors configured to acquire sensor data; and a processor coupled to the one or more airflow generating devices and to the one or more sensors and configured to:

determine, based on the sensor data, at least one of an orientation and a position associated with the user-mounted device;

compute a first force to be exerted on the user via the one or more airflow generating devices based on a force direction associated with a force event and at least one of the orientation and the position; and transmit a control signal to the one or more airflow generating devices to exert the first force on the user.

2. The system of claim 1, wherein the one or more airflow generating devices comprise one or more fans, and the processor is further configured to determine a fan orientation based on the force direction and at least one of the orientation and the position, and to generate a second control signal to reposition at least one fan included in the one or more fans based on the fan orientation.

3. The system of claim 1, wherein the processor is further configured to determine that at least one of the orientation and the position has changed, and, in response, reposition at least one airflow generating device included in the one or more airflow generating devices.

4. The system of claim 2, wherein the force is computed based on the orientation associated with the user-mounted device, and the processor is further configured to determine that the user-mounted device has reached a target orientation associated with the force event, and, in response, generate a second control signal to stop the one or more airflow generating devices.

5. The system of claim 1, wherein the one or more sensors comprise at least one of a global navigation satellite system (GNSS) receiver, a magnetometer, an accelerometer, and an optical sensor.

6. The system of claim 1, wherein the user-mounted device comprises a head-mounted device, and the orientation and the position associated with the head-mounted device comprise a head orientation and a head position, respectively.

7. The system of claim 1, wherein the force event is associated with a navigation instruction, and the processor is configured to generate the control signal for the one or more airflow generating devices when the user-mounted device is approaching a street intersection.

8. The system of claim 7, wherein the processor is further configured to:

receive a second force event associated with a second navigation instruction;

compute a second force to be exerted via the one or more airflow generating devices based on a second force direction associated with the second force event and at least one of the orientation and the position of the user-mounted device; and generate a second control signal for the one or more airflow generating devices based on the second force when the user-mounted device is approaching a second street intersection.

9. The system of claim 1, wherein the user-mounted device comprises at least one of a shoulder-mounted device, a waist-mounted device, and a wrist-mounted device, and the orientation and the position are associated with at least one of a shoulder, a waist, and a wrist of the user, respectively.

10. The system of claim 1, wherein the force is computed based on the position associated with the user-mounted device, and the processor is further configured to determine that the user-mounted device has reached a target position, and, in response, generate a second control signal to stop the one or more airflow generating devices.

11. The system of claim 1, further comprising a control module electrically coupled to the one or more airflow generating devices, wherein the one or more sensors are disposed within an auxiliary device that comprises at least one of a smartphone and a mobile computer, and the one or more sensors are configured to wirelessly communicate with the control module.

12. A non-transitory computer-readable storage medium including instructions that, when executed by a processor, configure the processor to cause forces to be exerted on a user, by performing the steps of:

determining, based on sensor data, at least one of an orientation and a position associated with a force device;

computing a first force to be exerted on the user via one or more airflow generating devices included in the force device based on a force direction associated with a force event and at least one of the orientation and the position, wherein each of the one or more airflow generating devices is configured to exert forces on the user by generating thrust; and transmitting a control signal to the one or more airflow generating devices to exert the first force on the user.

13. The non-transitory computer-readable storage medium of claim 12, further comprising generating the force event by identifying, based on the sensor data, an object in a surrounding environment, wherein the object is located in the force direction relative to the force device.

14. The non-transitory computer-readable storage medium of claim 13, wherein the force event further comprises a force magnitude that is based on at least one of a distance from the force device to the object and a speed of the object.

15. The non-transitory computer-readable storage medium of claim 12, further comprising receiving the force event via a wireless communication device included in the force device.

16. The non-transitory computer-readable storage medium of claim 12, further comprising generating the force event based on determining that the orientation of the force device is outside of a threshold range, wherein the force is configured to be exerted on the user to instruct the user to return within the threshold range.

17. The non-transitory computer-readable storage medium of claim 16, wherein the sensor data is acquired via an angular sensor, and the threshold range comprises an angular range associated with the posture of the user.

18. The non-transitory computer-readable storage medium of claim 16, wherein the sensor data is acquired via a magnetometer, and the threshold range is associated with a direction towards a destination to which the user is navigating.

19. The non-transitory computer-readable storage medium of claim 12, wherein the force direction specifies a rotational force to be exerted on the user via the force device.

20. The non-transitory computer-readable storage medium of claim 12, wherein the one or more airflow generating devices comprise one or more fans, and further comprising determining a fan orientation based on the force direction and the orientation, and generating a second control signal to reposition at least one fan included in the one or more fans based on the fan orientation.

21. The non-transitory computer-readable storage medium of claim 12, further comprising determining that the orientation has changed, and, in response, repositioning at least one airflow generating device included in the one or more airflow generating devices based on an updated orientation determined via one or more sensors.

22. A method for exerting forces on a user, the method comprising:

determining, based on sensor data, at least one of an orientation and a position associated with a user-mounted device;

computing a first force to be exerted on the user via one or more airflow generating devices included in the user-mounted device based on a force direction and a force magnitude associated with a force event and at least one of the orientation and the position, wherein each of the one or more airflow generating devices is configured to exert forces on the user by generating thrust; and transmitting a control signal to the one or more airflow generating devices to exert the first force on the user.

23. The method of claim 22, wherein the one or more airflow generating devices comprise one or more fans, and further comprising determining a fan orientation based on the force direction, the orientation, and the position, and generating a second control signal to reposition at least one fan included in the one or more fans based on the fan orientation.

24. The system of claim 1, wherein the one or more airflow generating devices comprise one or more fans for generating the thrust.

25. The system of claim 1, wherein the control signal causes at least one of the one or more airflow generating devices to modify a direction in which the thrust is generated based on the force direction.

26. An apparatus for exerting forces on a user by generating thrust, the system comprising:

one or more devices, wherein the one or more force exerting devices comprise one or more fans;

one or more sensors configured to acquire sensor data; and a processor coupled to the one or more devices and to the one or more sensors and configured to:

determine, based on the sensor data, at least one of an orientation and a position associated with the apparatus;

compute a force to be exerted via the one or more devices and determine a fan orientation based on a force direction associated with a force event and at least one of the orientation and the position;

generate a control signal for the one or more devices based on the force; and generate a second control signal to reposition at least one fan included in the one or more fans based on the fan orientation.

* * * * *